United States Patent [19]
Hung et al.

[11] Patent Number: 5,616,625
[45] Date of Patent: Apr. 1, 1997

[54] REACTIVE HOT MELT FOAM

[75] Inventors: Ju-Ming Hung, Yardley, Pa.; James W. Nowicki, Hopewell, N.J.

[73] Assignee: National Starch and Chemical Investment Holding Corporation, Wilmington, Del.

[21] Appl. No.: 390,443

[22] Filed: Feb. 17, 1995

[51] Int. Cl.$^6$ ...................................................... C08J 9/08
[52] U.S. Cl. ........................ 521/79; 521/80; 521/115; 521/128; 521/155; 521/159; 525/93; 525/96; 525/111; 525/127; 525/130; 525/455
[58] Field of Search ............................. 521/115, 80, 128, 521/79, 155, 159; 525/93, 96, 111, 127, 130, 455

[56] References Cited

U.S. PATENT DOCUMENTS

| | | |
|---|---|---|
| 3,645,925 | 2/1972 | Speranza et al. . |
| 3,931,077 | 1/1976 | Uchigaki et al. . |
| 4,059,714 | 11/1977 | Scholl et al. ............................... 156/78 |
| 4,200,207 | 4/1980 | Akers et al. . |
| 4,264,214 | 4/1981 | Scholl et al. . |
| 4,758,648 | 7/1988 | Rizk et al. ................................... 528/53 |
| 4,775,719 | 10/1988 | Markevka et al. ........................ 525/125 |
| 4,808,255 | 2/1989 | Markevka et al. ..................... 156/307.3 |
| 4,820,368 | 4/1989 | Markevka et al. ..................... 156/307.3 |
| 4,891,269 | 1/1990 | Markevka et al. ........................ 428/423 |
| 5,021,507 | 6/1991 | Stanley et al. ............................. 525/127 |
| 5,075,386 | 12/1991 | Vanderbilt ............................... 525/327.3 |
| 5,075,407 | 12/1991 | Cody et al. . |
| 5,130,404 | 7/1992 | Freeland ...................................... 528/52 |
| 5,159,125 | 10/1992 | Hagen ........................................ 568/904 |
| 5,189,073 | 2/1993 | Humbert et al. ........................ 521/110 |
| 5,207,352 | 5/1993 | Porter et al. . |
| 5,266,606 | 11/1993 | Gilch et al. ............................... 521/159 |
| 5,332,125 | 7/1994 | Schmitkons et al. . |

FOREIGN PATENT DOCUMENTS

| | | |
|---|---|---|
| 0086621 | 8/1983 | European Pat. Off. . |
| 0246473 | 4/1987 | European Pat. Off. . |
| 0264675 | 9/1987 | European Pat. Off. . |
| 0532765 | 4/1992 | European Pat. Off. . |
| 0532765A1 | 3/1993 | European Pat. Off. . |
| 0632077 | 6/1994 | European Pat. Off. . |
| 41-39478 | 6/1966 | Japan . |
| 41-39479 | 6/1966 | Japan . |
| 41-76830 | 11/1966 | Japan . |
| 5-117619 | 5/1993 | Japan . |
| WO86/01397 | 3/1986 | WIPO . |

OTHER PUBLICATIONS

"TEXACAT® DMDEE Catalyst", Texaco Chemical Company, Technical Bulletin, 1988.

"PUR Technology Offers Expanded Application Opportunities", Philip A. Souze, *Adhesives Age,* August 1993, pp. 20–23.

*Primary Examiner*—James J. Seidleck
*Assistant Examiner*—John M. Cooney, Jr.
*Attorney, Agent, or Firm*—Ellen T. Dec

[57] ABSTRACT

A process for foaming polyurethane reactive hot melt adhesive comprising the steps of:

a) melting a reactive polyurethane adhesive containing 0.05 to 0.5% by weight of a 2,2'dimorpholinodiethyl ether or di(2,6-dimethylmorpholinodiethyl)ether catalyst in a heated reservoir b) pumping the adhesive from the heated into a heated reservoir recirculating foaming device;

c) foaming the adhesive by injecting therein an effective amount of an anhydrous gas;

d) discharging a portion of the foamed adhesive through an orifice onto a substrate to be bonded; and e) recirculating the remaining foamed adhesive back to the foaming device for discharge at a later time.

7 Claims, No Drawings

REACTIVE HOT MELT FOAM

The present invention relates to an improved process for foaming moisture curable reactive hot melt adhesives utilizing recirculating foaming equipment. The process provides moisture curable sealant compositions having good storage stability in the absence of moisture and rapid and thorough cure rates throughout the adhesive once it is foamed and exposed to moisture.

Foamed adhesives, including hot melt compositions are well known in the art. Such applications involve the mixture of hot melt thermoplastic adhesive and a blowing agent wherein a polymer/gas adhesive solution is formed and transmitted under pressure to and through a dispenser. Upon emerging from the nozzle of the dispenser into atmospheric pressure, the gas evolves from the solution in the form of small bubbles causing the adhesive to expand volumetrically. The resultant adhesive in an uncompressed state sets up as a homogeneous solid foam having gas cells substantially evenly distributed throughout the adhesive. It has been found that foaming adhesives can result in improved gap filling properties while providing significant material cost reductions.

Among the adhesives most commonly foamed in accordance with the methods described above are, what has come to be known as a reactive hot melt. Reactive hot melts are one-component, 100% solid, solvent-free urethane prepolymers. Unlike conventional hot melts that can be repeatedly heated from its solid state and flowed to a liquid form, the reactive hot melt behaves as a thermoset and goes through an irreversible chemical reaction once dispensed in the presence of ambient moisture.

The reactive hot melts are isocyanate terminated prepolymers that react with surface or ambient moisture in order to chain-extend, forming a new polyurethane polymer which offers performance superior to that obtained with conventional hot melt.

These reactive hot melts will bond to a variety of substrates including plastics, woods, fabrics and some metals making them ideal candidates for bonding dissimilar substrates. Moreover, they are flexible and durable by nature, so they may be used in extreme temperature ranges of −30° to +150° C. while providing excellent moisture and chemical resistance.

The fact that these formulations cure with ambient moisture creates potential problems when the adhesives are foamed since it is difficult for the moisture to permeate into the total foamed adhesive composition thereby substantially retarding the rate of cure. In some extreme cases, the cure of the outer surface is so complete as to prevent the permeation of additional moisture such that the inner portion of the foamed composition does not cure for weeks or even months. This slow rate of cure renders these products unsuitable for commercial use, particularly where relatively thick adhesive coatings are required.

It has been suggested that the curing of the polymer can be accelerated with catalysts such as metal salts including tin and bismuth carboxylates, organosilicon titantes, alkyltitanate, amines and the like. However, these catalysts can only be used with foaming units such as Nordsons Foam Mix (TM) where the adhesive is immediately dispensed after foaming. These catalysts therefore are not useful in equipment such as the Nordson Foam Melt (TM) where some or all of the foamed adhesive is recirculated within the equipment. In these cases, the presence of the catalyst results in instability and/or gelling of the foamed adhesive within the melting and dispensing equipment.

It would therefore be beneficial to provide a process for enhancing the cure speed of reactive hot melt adhesives which are foamed using equipment which involves recirculation of the foamed adhesives and wherein the adhesive present in the equipment is process stable, even after injection of the foaming gas.

SUMMARY OF THE INVENTION

We have now found that the curing speed of polyurethane reactive hot melt adhesives which are foamed using recirculating foaming systems may be significantly improved with little or no effect on the melt stability by the use of a catalyst containing both ether and morpholine functional groups. Thus, the hot melt systems of the present invention cure at substantially higher rates and throughout the entire foamed coating but are not accompanied by undesirable increases in viscosity or melt instability in the absence of moisture even after a portion of the adhesive containing the injected gas has been recirculated back within the foaming and dispensing unit.

Thus, the present invention is directed to a process for foaming polyurethane reactive hot melt adhesive comprising the steps of:

a) melting a reactive polyurethane adhesive containing 0.05 to 0.5% by weight of a 2,2'dimorpholinodiethyl ether or di(2,6-dimethylmorpholinodiethyl)ether catalyst in a heated reservoir;

b) pumping the adhesive from the heated reservoir into a heated recirculating foaming device;

c) foaming the adhesive by injecting therein an effective amount of an anhydrous gas;

d) discharging a portion of the foamed adhesive through an orifice onto a substrate to be bonded; and e) recirculating the remaining foamed adhesive back to the foaming device to be discharged at some later time.

The ether and morpholine containing catalyst useful herein 2,2'dimorpholinodiethyl ether or di(2,6-dimethylmorpholinodiethyl)ether represented by the following formulas 1 and 2:

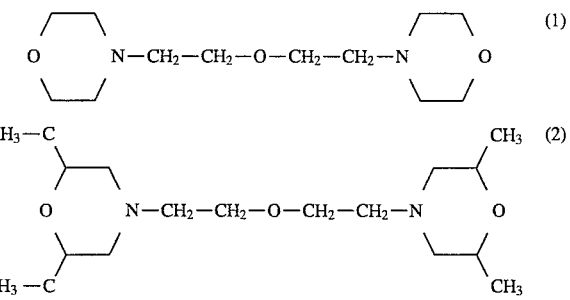

A representative commercially available catalyst of formula 1 is Texacat DMDEE from Texaco and that of formula 2 is available as U-CAT 2041 from Sanapuro Co. The catalysts are used in effective amounts, i.e., an amount sufficient to catalyze the reaction. Generally, these amounts vary within the range of 0.05 to 0.5% by weight, preferably 0.075 to 0.2%. The optimum amount depends upon the isocyanate content of the prepolymer as well as the temperature and moisture in the invention.

While the catalyst described herein may be used for any polyurethane reactive hot melt adhesive, if finds particular application in polyurethane reactive hot melts containing residual ethylenic unsaturation or those urethane prepolymer compositions containing a thermoplastic polymer selected from the group consisting of an A-B-A block copolymer, an A-(B-A)$_n$-B block copolymer, and a radial A-B-A block copolymer wherein n is an integer from about 2 to 50, each A is a polystyrene block and each B is a rubbery block.

Thus, the first and preferred class of hot melts for use herein are prepared by the incorporation in the urethane prepolymer of a low molecular weight polymer. The low molecular weight polymer may be added to a polyol component prior to reaction with the isocyanate components or it may be added to the already formed prepolymer. Suitable adhesives may also be formed through the simultaneous polymerization of the urethane prepolymer and the ethylenically unsaturated monomers. The polyurethane prepolymer may also be polymerized in the ethylenically unsaturated monomers, which are then subsequently polymerized to form the adhesive. Alternatively, if a polyol is used to form the prepolymer, the ethylenically unsaturated monomers may be polymerized in the polyol using free radical polymerization procedures. In this case, the isocyanate components are subsequently polymerized with the mixture using conventional condensation polymerization procedures. This latter polymerization procedure has the advantage of excellent control of the molecular weight of the resulting vinyl polymer (as determined by intrinsic viscosity) and also produces a polymer which is free of detrimental impurities. In addition, the reduction in the handling and inventory of materials and elimination of intermediate packaging and storage bring about significant cost savings.

In the specific embodiment wherein an ethylenically unsaturated monomer containing moisture reactive functional groups is employed, the reactive nature of the crosslinking monomer requires that the monomer be added after the prepolymer has been formed. Thus, in this embodiment, the (co)polymer may be added in its polymerized form to the already formed prepolymer. Alternatively, and more preferably, the monomer or monomers are added to the already formed polyurethane prepolymer and polymerized therein using free radical polymerization procedures.

Any ethylenically unsaturated monomer capable of free radical polymerization and which does not contain active hydrogen may be used herein. Most commonly employed are the $C_1$ to $C_{12}$ esters of acrylic and methacrylic acids including, but not limited to methyl acrylate, ethyl acrylate, n-butyl acrylate, isobutyl acrylate, n-propyl or iso-propyl acrylate as well as the corresponding methacrylates. Mixtures of compatible (meth)acrylate monomers may also be used. Such mixtures, including mixtures of butyl and methyl methacrylate are well known in the art. Additional ethylenically unsaturated monomers such as vinyl esters (e.g., vinyl acetate and vinyl propionate), vinyl ethers, fumarates, maleates, styrene, acrylonitrile, ethylene, vinyl ethers, etc., may be used as may comonomers thereof.

When the ethylenically unsaturated monomer contains moisture reactive functional groups, any such monomer containing moisture reactive (curable) functional groups may be employed. In particular, monomers containing silane or reactive isocyanate functionality are particularly useful herein.

Typical of useful silane or isocyanate containing ethylenically unsaturated copolymers are those which contain only mers derived from an ethylenically unsaturated monomer containing silane or isocyanate functional groups of those which contain up to 99% by weight of mers derived from a non-silane or non-isocyanate containing ethylenically unsaturated monomer capable of free radical polymerization. Thus, the final ethylenically unsaturated silane or isocyanate containing copolymer may contain I to 100% of the polymerized ethylenically unsaturated silane or isocyanate monomer, preferably up to 50% by weight and more preferably (from an economic standpoint) 5 to 30% by weight. Indeed, levels of ethylenically unsaturated silane or isocyanate containing monomers in the range of 15% or less have been shown to provide potentially commercially significant results.

The ethylenically unsaturated silanes are preferably those which will participate directly in the reaction by free-radical polymerization and which do not contain active hydrogen. Representative commercially available silanes of this type include vinyltrichlorosilane, vinyltriethoxysilane, vinyltrimethoxy-silane, vinyltris(2-methoxyethoxy) silane, 3-methacryloxypropyltrimethoxysilane, 3-methacryloxypropyltris(2-methoxyethoxy)silane, vinyltriacetoxysilane, 4-(3-trimethethoxysilylpropyl-benzylstyrene sulfonate, 3-acryloxypropyltrimethoxy-silane, allyltriethoxysilane, allyltrimethoxysilane, vinylmethyldiethoxysilane, vinyldimethylethoxysilane, vinylmethyldiacetoxysilane, 3-methyacryloxypropyl-methyl-diethoxysilane, 3-acryloxypropyldimethylmethoxysilane, etc.

The ethylenically unsaturated isocyanates are also preferably those which will participate directly in this reaction by free-radical polymerization and which do not contain active hydrogen. Representative commercially available isocyanates of this type include isocyanatoethyl methacrylate and m-isopropenyl-γ,γ-dimethylbenzyl isocyanate.

As discussed above, any ethylenically unsaturated monomer capable of free radical polymerization and which does not contain active hydrogen may be employed as a comonomer in forming the final silane or isocyanate containing copolymer. Most commonly employed are the $C_1$ to $C_{12}$ esters of acrylic and methacrylic acids including, but not limited to methyl acrylate, ethyl acrylate, n-butyl acrylate, isobutyl acrylate, n-propyl or iso-propyl acrylate as well as the corresponding methacrylates. Mixtures of compatible (meth-)acrylate monomers may also be used. Such mixtures, including mixtures of butyl and methyl methacrylate are well known in the art. Additional ethylenically unsaturated monomers such as vinyl esters (e.g., vinyl acetate and vinyl propionate), vinyl ethers, fumarates, maleates, styrene, acrylonitrile, ethylene, vinyl ethers, etc., may be used as may copolymers thereof. Typical adhesives of this class are described, for example, in U.S. Pat. No. 5,021,507 to Stanley, et al.

The urethane prepolymers are those conventionally used in the production of polyurethane hot melt adhesive compositions. Most commonly, the prepolymer is prepared by the condensation polymerization of a polyisocyanate with a polyol, most preferably the polymerization of a diisocyanate with a diol. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol.

In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above. Also, small amounts of low molecular weight dihydroxy, diamino, or amino hydroxy compounds may be used such as saturated and unsaturated glycols, e.g., ethylene glycol or condensates thereof such as diethylene glycol, triethylene glycol, and the like; ethylene diamine, hexamethylene diamine and the like; ethanolamine, propanolamine, N-methyldiethanolamine and the like.

Any suitable organic polyisocyanate may be used such as, for example, ethylene diisocyanate, ethylidene diisocyanate, propylene diisocyanate, butylene diisocyanate, hexamethylene diisocyanate, toluenediisocyanate, cyclopentylene-1,3,-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate, 4,4', 4"-triisocyanatotriphenylmethane, 1,3,5-triisocyanato-benzene, 2,4,6-triisocyanato-toluene, 4,4'-dimethyldiphenylmethane-2,2',5,5-tetraisocyanate, and the like.

In accordance with a preferred embodiment, the urethane prepolymer is prepared from the condensation of a diisocyanate with a diol so as to produce a prepolymer having an isocyanate functionality of about 2, i.e., a functionality from about 1.7 to 2.2.

The polyisocyanate and polyol, polyamino or polymercapto components are combined in proportions so as to yield a urethane prepolymer characterized by an isocyanate content of from 0.25 to 15%, preferably to about 10%, and most preferably from 1.5 to 5%. In addition, the ratio of isocyanate equivalents to hydroxyl, amino or mercapto equivalents (known as the isocyanate index) should be greater than 1 but no more than about 2. By maintaining the low isocyanate index, we are able to reduce the level of free isocyanate content in the final hot melt adhesive composition to less than about 4%, preferably less than 1%. It will be recognized that the presence of higher levels of free isocyanate has a detrimental effect on a hot melt formulation since it causes toxic fumes to be released when the adhesive is heated to application temperature. The higher levels of free isocyanate may also cause reduction in viscosity and poorer initial bond strength of the adhesive. The precise amount of the polyisocyanate used in the polymerization will depend on the equivalent weight and amount of the non-isocyanate components, and the particular polyisocyanate employed. In general, the amount of the polyisocyanate needed to achieve the isocyanate content will vary from about 5 to about 55% of the final prepolymer.

In the broadest sense, the ethylenically unsaturated monomer may be polymerized using conventional free radical polymerization procedures to a relatively low molecular weight. For purposes of clarification herein, by "low molecular weight" we mean weight average molecular weights in the range of approximately 10,000 to 30,000. The low molecular weight is obtained by careful monitoring and controlling the reaction conditions and, generally, by carrying out the reaction in the presence of a chain transfer agent such as dodecyl mercaptan. There is a recognized correlation between intrinsic viscosity and molecular weight and we have found that, in general, monomers polymerized to an intrinsic viscosity of 0.1 to 0.4 (I.V. as measured in a 9:1 mixture of tetrahydrofuran and alcohol) are particularly preferred for use herein. In this embodiment, the low molecular weight polymer is then blended either with the polyol and dissolved therein prior to reaction with the isocyanate component or the low molecular weight polymer is dissolved in the already formed urethane prepolymer. In the case of polyamino or polymercapto containing prepolymers, in-situ vinylic polymerization must be performed only in the pre-formed prepolymer. In either case, low molecular weight polymer is combined with the isocyanate terminated urethane prepolymer in a proportion such that the reactive curing hot melt adhesive contains about 5 to 90% of the urethane prepolymer and 95% to 10% of the low molecular weight polymer. Care should be taken in storing and handling the low molecular weight polymer to avoid contamination with ambient moisture or other factors which might affect the stability of the prepolymer system.

In accordance with an alternate method for preparing the urethane prepolymers, where the ethylenically unsaturated monomers do not contain reactive functional groups, and wherein a polyol is employed, the monomers are combined in an amount of 2 to 90% by weight with 10 to 98% by weight of the polyol and polymerized therein using conventional free radical polymerization procedures in the presence of a chain transfer agent such as dodecyl mercaptan to achieve the low molecular weight polymer dissolved in the polyol. Subsequent to the polymerization of the ethylenically unsaturated monomer(s), the polyisocyanate and any additional ingredients required for the urethane prepolymer forming reaction are added and that reaction is carried out using conventional condensation polymerization procedures. In this manner, the resultant isocyanate terminated urethane prepolymer forms the reactive curing hot melt adhesive described above which contains about 5 to 90% of the urethane prepolymer and 95 to 10% of the low molecular weight polymer.

It is also possible in the case of monomers which do not contain isocyanate reactive functional groups to polymerize the low molecular weight polymer in the presence of the already formed isocyanate terminated urethane prepolymer. This method has the drawback of subjecting the prepolymer to unnecessary heating during the acrylic polymerization, heating that might result in branching, viscosity increase, depletion of needed isocyanate groups and possible gelation. Although these disadvantages are subject to control, more stringent control of conditions are required as compared to polymerization in the non-isocyanate functional urethane components. When the reaction is run in the polyol or other non-isocyanate containing component, there is also the advantage of lower reaction viscosities and reduced exposure to isocyanate vapors because of the lesser amount of heating required.

The second class of reactive urethane adhesives used herein are those prepared by the incorporation in the urethane prepolymer of 1 to 200 parts by weight per each 100 part of the prepolymer of a thermoplastic polymer selected from the group consisting of an A-B-A block copolymer, an A-(B-A-)$_n$-B block copolymer, and a radial A-B-A block copolymer wherein n is an integer from 2 to 50, each A is a polystyrene block and each B is a rubbery block. Typical adhesives of this class are described in U.S. Pat. No. 4,820,368 to Markwka, et al.

While the adhesives may be used directly as described above, if desired the adhesives of the present invention may also be formulated with conventional additives such as plasticizers, compatible tackifiers, anti-oxidants, pigments, stabilizers and the like.

As discussed above, the morpholine and ether containing catalyst is used in an effective amount, generally 0.05 to 0.5%, preferably up to about 0.2% by weight of the adhesive. It is incorporated into the adhesive by blending or addition in the absence of moisture, as by use of a nitrogen blanket. The catalyst may be post-added after preparation of the reactive urethane hot melt adhesive or, alternatively, the catalyst may be added before or during the prepolymer preparation.

In accordance with the present invention, the hot melt adhesive is charged into the melting reservoir of the foam melting device and heated to 150° to 350° F. in order to keep the adhesive molten. The molten adhesive is then pumped from the melting reservoir into the recirculating foaming unit where the material is also maintained at a temperature of 150° to 350° F., preferably 200° to 300° F. While in the foaming unit, the adhesive is passed through a foaming pump where inert gas is injected at a pressure between 1 and 15 psi, preferably 3 to 8 psi, in an amount and at a rate sufficient to reduce the adhesive density by 30 to 70%, preferably 45 to 60%. The foamed adhesive is then extruded from the foaming unit through a heated dispenser orifice where it is applied to the substrate to be bonded. The portion of the foamed material which has passed into the dispenser but is not actually applied to the substrate is then recirculated back into the heated foaming unit where it may be combined with additional adhesive for subsequent foaming and application.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

The following example illustrates the preparation of an adhesive composition for use herein.

Elvacite 2013 is a 64% butylmethacrylate/36% methylmethacrylate copolymer of I.V. 0.2 available from DuPont. The Elvacite was vacuum dried in a desiccator for 24 hours immediately prior to use herein.

| Ingredients: | |
| --- | --- |
| Polypropylene Glycol (1000 Mol. wt.) | 472. gm |
| 1,6-hexanediol neopentyl glycol adipate (2000 Mol. wt.) | 202.7 |
| Elvacite 2013 | 300.0 |
| Methylene bisphenyl diisocyanate | 224.9 |

The polyols and the Elvacite 2013 were added to the vessel and heated to 100° C. until the Elvacite was dissolved. At that point the methylene bisphenyl diisocyanate was added, and the reaction was held at 100° C. for 3 hours. After the 3 hours at 100° C. the reaction was poured hot from the vessel. The samples had the following properties:

| Properties | |
| --- | --- |
| % Methylacrylate polymer | 25% |
| % Urethane prepolymer | 75% |
| % Isocyanate groups | 2.0% |
| Viscosity at 100° C. | 86,000 cps |
| Viscosity at 120° C. | 8,000 cps |
| Viscosity at room temp. | Solid |
| Intrinsic viscosity in THF/ETOH | 0.25 |
| Color | water white |
| Clarity | clear to very slightly hazy |
| Isocyanate Index | 1.6 |

An adhesive suitable for use herein may also be made by the following "in situ" polymerization procedure. In this case, a one liter reaction vessel was set up equipped with a condenser, gas inlet tube, slow addition tube, thermometer, stirrer, and provisions for heating/cooling. The ingredients of the reaction consisted of the following:

| | | |
| --- | --- | --- |
| 1. | Polypropylene glycol (1,000 mol wt.) | 275.8 gm |
| 2. | 1,6-hexane diol, neopentyl glycol adipate (3,000 M.W.) | 88.9 gm |
| 3. | 1,6-hexane diol, neopentyl glycol adipate (1,000 M.W.) | 29.3 gm |
| 4. | Butyl methacrylate | 17.8 gm |
| 5. | Butyl methacrylate | 94.1 gm |
| 6. | Methyl methacrylate | 9.4 gm |
| 7. | Methyl methacrylate | 53.6 gm |
| 8. | Dodecy mercaptan | 0.68 gm |
| 9. | Benzoyl peroxide | 1.7 gm |
| 10. | Benzoyl peroxide | 0.6 gm |
| 11. | Methylene bis phenyl diisocyanate | 131.1 gm |

The reaction vessel was purged with dry nitrogen and a slow stream of dry nitrogen was bubbled subsurface throughout the reaction. Ingredients designated 1, 2, 3, 4, 6, 8 and 9 were added to the vessel and the temperature raised to 80° C. After ½ hour at 80° C. ingredients 5 and 7 were added uniformly over a period of 1 hour. The reaction was held at 80° C. for an additional 3 hours, at which time 10 was added. The reaction was held an additional 2 hours at 80° C. and 11 was added; then the temperature was raised to 100° C. and held for 3 hours. At this point a vacuum of 120 mm to 130 mm was applied to the vessel for 20 minutes to 30 minutes and the reaction poured hot from the flask.

| Properties | |
| --- | --- |
| % Methacrylate polymer | 25% |
| Ration of butyl methacrylate to methyl methacrylate | 64 to 36 |
| % Urethane prepolymer | 75% |
| % isocyanate groups | 1.9% |
| Viscosity at 100° C. | 64,000 cps |
| Viscosity at 120° C. | 25.250 cps |
| Viscosity at RT | Solid |
| Intrinsic Viscosity in tetrahydrofuran/ethanol = 9/1 | 0.18 |
| Color | water white to very slightly amber |
| Clarity | clear to very slightly hazy |
| Calculated urethane prepolymer mol. wt. | 3315 mol. wt |
| Isocyanate Index | 1.6 |

EXAMPLE 2

The adhesive prepared according to the first embodiment of Example 1 was catalyzed by adding, under nitrogen, 0.1% of Texacat DMDEE, 2,2' dimorpholinodiethyl ether. For comparison, another sample was prepared which contained no catalyst (control).

The samples were tested using a Nordson Foam Melt 130 machine, the adhesives being foamed using sufficient dried nitrogen gas to reduce the adhesive density by 45%. Both samples dispensed readily from the equipment over an extended period of application.

In order to test the curing speed, the foamed adhesives were pumped into a foamed polystyrene cup having an average diameter of two inches and a height of three inches. The polystyrene cup was peeled off after the adhesive had cooled to room temperature. After peeling off of the polystyrene, ambient moisture could penetrate and cure the adhesive material. The adhesives were examined for curing speed after one and two weeks storage.

In general, the catalyzed adhesive showed a curing efficiency at least two times faster than the uncured comparative sample.

In a similar test, the adhesive mass remaining after the cup was peeled off was cut into two portions and placed in an oven at 250° F. so that the uncured adhesive would melt out of the cured foamed shell. After all the uncured adhesive had melted, the thickness of the cured shell was measured. The results are presented below:

| Sample | Curing Thickness | |
|---|---|---|
| | One Week | Two Weeks |
| Example 1 | ¼ inch | ⅜ inch |
| Example 2 | 9/16 inch | 1.0 inch |

The hardness of both cured samples were about 20 shore D

For comparative purposes, a polyurethane hot melt containing an aliphatic isocyanate was prepared according to the teachings of U.S. Pat. No. 5,166,606 to Gilch et al. and catalyzed with dibutyl tin dilaurate. When foamed and applied using the Foam Melt equipment described above, the portions of the foamed adhesive which were recirculated into the foaming unit began to gel in the equipment rendering the adhesive unsatisfactory of use in the equipment.

Based on the studies presented above, it is clear that the ether and morpholine containing catalysts provide foamed reactive urethane adhesives with desirable curing speeds which can be readily dispensed using conventionally employed recirculating foaming equipment.

What is claimed:

1. A process for foaming polyurethane reactive hot melt adhesive comprising the steps of:
   a) melting a reactive polyurethane adhesive containing 0.05 to 0.5% by weight of a 2,2'dimorpholinodiethyl ether or di(2,6-dimethylmorpholinodiethyl)ether catalyst in a heated reservoir;
   b) pumping the adhesive from the heated reservoir into a heated recirculating melt foaming device;
   c) foaming the adhesive by injecting therein an effective amount of an anhydrous gas;
   d) discharging a portion of the foamed adhesive through an orifice onto a substrate to be bonded; and
   e) recirculating the remaining foamed adhesive back to the foaming device to be stored for discharge at a time following the initial and subsequent recirculation back to the foaming device.

2. The process of claim 1 wherein the catalyst is present in the adhesive in an amount of 0.075 to 0.2% by weight.

3. The process of claim 1 wherein the catalyst is present in the adhesive in an amount of about 0.1% by weight.

4. The process of claim 1 wherein the catalyst in the adhesive is 2,2'dimorpholinodiethyl ether.

5. The process of claim 1 wherein the reactive polyurethane adhesive contains residual ethylenic unsaturation.

6. The process of claim 1 wherein the polyurethane adhesive contains a polyurethane prepolymer prepared by the condensation of a diisocyanate with a diol.

7. The process of claim 1 wherein the polyurethane adhesive is foamed using a recirculating Foam Melt unit available from Nordson.

* * * * *